United States Patent
Nas (10) Patent No.: US 9,712,341 B2
(45) Date of Patent: Jul. 18, 2017

(54) METHODS, SYSTEMS, AND COMPUTER READABLE MEDIA FOR PROVIDING E.164 NUMBER MAPPING (ENUM) TRANSLATION AT A BEARER INDEPENDENT CALL CONTROL (BICC) AND/OR SESSION INTIATION PROTOCOL (SIP) ROUTER

(75) Inventor: Petrus Wilhelmus Adrianus Jacobus Maria Nas, The Hague (NL)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/044,510

(22) Filed: Mar. 9, 2011

(65) Prior Publication Data
US 2011/0216762 A1  Sep. 8, 2011

Related U.S. Application Data (63) Continuation-in-part of application No. 12/689,702, filed on Jan. 19, 2010.
(Continued)

(51) Int. Cl.
H04L 12/66 (2006.01)
H04L 29/12 (2006.01)
H04L 29/06 (2006.01)

(52) U.S. Cl.
CPC ........ *H04L 12/66* (2013.01); *H04L 29/12311* (2013.01); *H04L 61/2084* (2013.01); *H04L 65/104* (2013.01); *H04L 65/1016* (2013.01)

(58) Field of Classification Search
CPC .............. H04L 12/66; H04L 29/12311; H04L 61/2084; H04L 65/1016; H04L 65/104;
(Continued)

(56) References Cited

U.S. PATENT DOCUMENTS 3,917,915 A  11/1975  Karras
4,162,377 A  7/1979  Mearns
(Continued)

FOREIGN PATENT DOCUMENTS

CN  ZL 200680017480.6  11/2011
EP  0 088 639  9/1983
(Continued)

OTHER PUBLICATIONS

Non-Final Official Action for U.S. Appl. No. 12/689,702 (Feb. 2, 2012).
(Continued)

*Primary Examiner* — Khaled Kassim
(74) *Attorney, Agent, or Firm* — Jenkins, Wilson, Taylor & Hunt, P.A.

(57) ABSTRACT

The subject matter described herein includes methods, systems and computer readable media for providing E.164 number mapping (ENUM) translation at a bearer independent call control (BICC) and/or session initiation protocol (SIP) router. One aspect of the subject matter described herein includes a system for providing ENUM translation. The system includes an ENUM database. The system also includes a signaling router for receiving a bearer independent call control (BICC) signaling message that includes a first call party identifier, for obtaining, from the ENUM database, a first SIP address associated with the first call party identifier, for generating a first SIP signaling message that includes the first SIP address, and for routing the first SIP signaling message to a destination SIP node.

21 Claims, 5 Drawing Sheets

Related U.S. Application Data (60) Provisional application No. 61/145,517, filed on Jan. 16, 2009, provisional application No. 61/318,233, filed on Mar. 26, 2010.

(58) Field of Classification Search
CPC .......... H04L 65/1069; H04M 3/42297; H04M 7/128
USPC .......... 370/352, 338, 467, 410, 401; 379/36, 379/207.02
See application file for complete search history.

(56) References Cited

U.S. PATENT DOCUMENTS

| | | |
|---|---|---|
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |
| 4,769,834 A | 9/1988 | Billinger et al. |
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,282,243 A | 1/1994 | Dabbaghi et al. |
| 5,291,481 A | 3/1994 | Doshi et al. |
| 5,315,580 A | 5/1994 | Phaal |
| 5,341,680 A | 8/1994 | Mains, Jr. |
| 5,402,474 A | 3/1995 | Miller et al. |
| 5,425,090 A | 6/1995 | Orriss |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,475,746 A | 12/1995 | Miller et al. |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,909 A | 8/1996 | Chanda et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,625,681 A | 4/1997 | Butler, II |
| 5,650,998 A | 7/1997 | Angenot et al. |
| 5,671,225 A | 9/1997 | Hooper et al. |
| 5,684,951 A | 11/1997 | Goldman et al. |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,812,639 A | 9/1998 | Bartholomew et al. |
| 5,838,683 A | 11/1998 | Corley et al. |
| 5,852,660 A | 12/1998 | Lindquist et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,002,693 A | 12/1999 | Hahn |
| 6,006,098 A | 12/1999 | Rathnasabapathy et al. |
| 6,009,160 A | 12/1999 | Sonnenberg |
| 6,021,126 A | 2/2000 | White et al. |
| 6,028,914 A | 2/2000 | Lin et al. |
| 6,069,946 A | 5/2000 | Lieuwen |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,097,960 A | 8/2000 | Rathnasabapathy et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,122,510 A | 9/2000 | Granberg |
| 6,128,304 A | 10/2000 | Gardell et al. |
| 6,128,377 A | 10/2000 | Sonnenberg |
| 6,134,307 A | 10/2000 | Brouckman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,134,618 A | 10/2000 | Hebert |
| 6,138,023 A | 10/2000 | Agarwal et al. |
| 6,145,120 A | 11/2000 | Highland |
| 6,167,129 A | 12/2000 | Fikis et al. |
| 6,181,937 B1 | 1/2001 | Joensuu |
| 6,182,086 B1 | 1/2001 | Lomet et al. |
| 6,188,752 B1 | 2/2001 | Lesley |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,289,095 B1 | 9/2001 | Buttitta et al. |
| 6,301,609 B1 | 10/2001 | Aravamudan et al. |
| 6,304,565 B1 | 10/2001 | Ramamurthy |
| 6,311,323 B1 | 10/2001 | Shulman et al. |
| 6,320,952 B1 | 11/2001 | Bruno et al. |
| 6,321,268 B1 | 11/2001 | Dillon et al. |
| 6,324,183 B1 | 11/2001 | Miller et al. |
| 6,327,267 B1 | 12/2001 | Valentine et al. |
| 6,333,931 B1 | 12/2001 | LaPier et al. |
| 6,353,896 B1 | 3/2002 | Holzmann et al. |
| 6,359,979 B1 | 3/2002 | Wang et al. |
| 6,363,411 B1 | 3/2002 | Dugan et al. |
| 6,366,658 B1 | 4/2002 | Bjornberg et al. |
| 6,373,930 B1 | 4/2002 | McConnell et al. |
| 6,393,269 B1 | 5/2002 | Hartmaier et al. |
| 6,396,840 B1 | 5/2002 | Rose et al. |
| 6,424,621 B1 | 7/2002 | Ramaswamy et al. |
| 6,430,176 B1 | 8/2002 | Christie, IV |
| 6,434,155 B1 | 8/2002 | Jones et al. |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,493,433 B2 | 12/2002 | Clabaugh et al. |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,574,481 B1 | 6/2003 | Rathnasabapathy et al. |
| 6,578,187 B2 | 6/2003 | Yasuda |
| 6,584,183 B2 | 6/2003 | Manto |

(56) References Cited

U.S. PATENT DOCUMENTS

| | | |
|---|---|---|
| 6,611,516 B1 | 8/2003 | Pirkola et al. |
| 6,611,584 B1 | 8/2003 | Khello et al. |
| 6,625,273 B1 | 9/2003 | Ashdown et al. |
| 6,633,764 B1 | 10/2003 | Garcia |
| 6,636,504 B1 | 10/2003 | Albers et al. |
| 6,639,981 B1 | 10/2003 | Dunn, Jr. et al. |
| 6,647,111 B1 | 11/2003 | Bjornberg et al. |
| 6,654,451 B1 | 11/2003 | Ward |
| 6,678,242 B1 | 1/2004 | Simon |
| 6,718,178 B1 | 4/2004 | Sladek et al. |
| 6,724,869 B2 | 4/2004 | Chapman et al. |
| 6,731,741 B1 | 5/2004 | Fourcand et al. |
| 6,747,970 B1 | 6/2004 | Lamb et al. |
| 6,748,585 B2 | 6/2004 | Proebsting et al. |
| 6,760,343 B1 | 7/2004 | Krishnamurthy et al. |
| 6,779,030 B1 | 8/2004 | Dugan et al. |
| 6,785,374 B2 | 8/2004 | Wang et al. |
| 6,788,777 B2 | 9/2004 | Goldman et al. |
| 6,795,546 B2 | 9/2004 | Delaney et al. |
| 6,801,781 B1 | 10/2004 | Provost et al. |
| 6,865,266 B1 | 3/2005 | Pershan |
| 6,920,214 B1 | 7/2005 | Sbisa et al. |
| 6,940,857 B2 | 9/2005 | Weinman, Jr. |
| 6,944,666 B2 | 9/2005 | Belkin |
| 6,959,076 B2 | 10/2005 | Chang et al. |
| 6,963,583 B1 | 11/2005 | Foti |
| 6,968,052 B2 | 11/2005 | Wullert, II |
| 7,010,114 B2 | 3/2006 | Stahl et al. |
| 7,058,036 B1 | 6/2006 | Yu et al. |
| 7,079,853 B2 | 7/2006 | Rathnasabapathy et al. |
| 7,085,362 B1 | 8/2006 | Christie et al. |
| 7,260,207 B2 | 8/2007 | Marsico |
| 7,286,545 B1 | 10/2007 | Tester et al. |
| 7,394,818 B1 | 7/2008 | Johnson et al. |
| 7,554,974 B2 | 6/2009 | Palmer et al. |
| 7,636,430 B2 | 12/2009 | Lang |
| 7,650,367 B2 | 1/2010 | Arruza |
| 7,657,015 B1 | 2/2010 | Brown et al. |
| 7,856,094 B2 | 12/2010 | Khadri et al. |
| 7,864,752 B1 | 1/2011 | Bennett et al. |
| 8,184,797 B1 | 5/2012 | Rosen |
| 8,199,892 B2 | 6/2012 | Ravishankar et al. |
| 8,218,527 B2 | 7/2012 | Kung et al. |
| 8,520,828 B2 | 8/2013 | Khadri et al. |
| 8,600,007 B2 | 12/2013 | Vijay Marathe et al. |
| 8,649,498 B1* | 2/2014 | Rankin ............ H04M 3/42314 379/219 |
| 9,219,677 B2 | 12/2015 | McCann et al. |
| 2001/0031641 A1 | 10/2001 | Ung et al. |
| 2001/0034224 A1 | 10/2001 | McDowell et al. |
| 2001/0040957 A1 | 11/2001 | McCann et al. |
| 2001/0046285 A1 | 11/2001 | Park |
| 2001/0053218 A1 | 12/2001 | Leung et al. |
| 2002/0023164 A1 | 2/2002 | Lahr |
| 2002/0029189 A1 | 3/2002 | Titus et al. |
| 2002/0048360 A1 | 4/2002 | Zambre et al. |
| 2002/0054667 A1 | 5/2002 | Martinez |
| 2002/0054674 A1 | 5/2002 | Chang et al. |
| 2002/0058507 A1 | 5/2002 | Valentine et al. |
| 2002/0059411 A1 | 5/2002 | Barnhouse et al. |
| 2002/0111153 A1 | 8/2002 | Hartmaier et al. |
| 2002/0126708 A1 | 9/2002 | Skog et al. |
| 2002/0150079 A1 | 10/2002 | Zabawskyj et al. |
| 2002/0163922 A1 | 11/2002 | Dooley et al. |
| 2002/0178262 A1 | 11/2002 | Bonnell et al. |
| 2002/0191768 A1 | 12/2002 | Stoughton |
| 2003/0007482 A1 | 1/2003 | Khello et al. |
| 2003/0026289 A1 | 2/2003 | Mukherjee et al. |
| 2003/0027591 A1 | 2/2003 | Wall |
| 2003/0031160 A1 | 2/2003 | Gibson Ang et al. |
| 2003/0037108 A1 | 2/2003 | Peiffer et al. |
| 2003/0050969 A1 | 3/2003 | Sant et al. |
| 2003/0076941 A1 | 4/2003 | Tiliks et al. |
| 2003/0131263 A1 | 7/2003 | Keane et al. |
| 2003/0177281 A1 | 9/2003 | McQuillan et al. |
| 2003/0203740 A1 | 10/2003 | Bahl et al. |
| 2003/0231623 A1* | 12/2003 | Ryu .................. H04L 45/04 370/352 |
| 2003/0231652 A1 | 12/2003 | Sprague et al. |
| 2003/0235285 A1 | 12/2003 | Marsico |
| 2004/0003037 A1 | 1/2004 | Fujimoto et al. |
| 2004/0024894 A1 | 2/2004 | Osman et al. |
| 2004/0091093 A1 | 5/2004 | Bookstaff |
| 2004/0096049 A1 | 5/2004 | Delaney et al. |
| 2004/0153506 A1 | 8/2004 | Ito et al. |
| 2004/0184435 A1 | 9/2004 | Westman |
| 2004/0228466 A1 | 11/2004 | Bedingfield, Sr. et al. |
| 2004/0233840 A1 | 11/2004 | Bye |
| 2004/0240381 A1* | 12/2004 | Clark et al. ................... 370/229 |
| 2004/0264671 A1 | 12/2004 | Lamberton et al. |
| 2005/0027867 A1 | 2/2005 | Mueller et al. |
| 2005/0070310 A1 | 3/2005 | Caspi et al. |
| 2005/0094623 A1 | 5/2005 | D'Eletto |
| 2005/0141528 A1 | 6/2005 | Matsuhashi et al. |
| 2005/0202836 A1 | 9/2005 | Schaedler et al. |
| 2005/0203994 A1 | 9/2005 | Palmer et al. |
| 2005/0281399 A1 | 12/2005 | Moisey et al. |
| 2006/0025114 A1 | 2/2006 | Bales et al. |
| 2006/0079236 A1 | 4/2006 | Del Pino et al. |
| 2006/0105766 A1 | 5/2006 | Azada et al. |
| 2006/0136557 A1 | 6/2006 | Schaedler et al. |
| 2006/0143517 A1 | 6/2006 | Douceur et al. |
| 2006/0209791 A1 | 9/2006 | Khadri et al. |
| 2006/0291488 A1 | 12/2006 | Naqvi et al. |
| 2007/0086582 A1 | 4/2007 | Tai et al. |
| 2007/0127436 A1* | 6/2007 | Karimi-Cherkandi et al. ............................ 370/352 |
| 2007/0140158 A1 | 6/2007 | Schwarzbauer et al. |
| 2007/0168421 A1 | 7/2007 | Kalyanpur et al. |
| 2007/0206735 A1 | 9/2007 | Silver et al. |
| 2007/0206747 A1 | 9/2007 | Gruchala et al. |
| 2008/0031196 A1 | 2/2008 | Marathe et al. |
| 2008/0080488 A1* | 4/2008 | Marsico ........................ 370/352 |
| 2008/0139170 A1 | 6/2008 | Kahn |
| 2008/0181382 A1 | 7/2008 | Lean et al. |
| 2008/0209564 A1 | 8/2008 | Gayde et al. |
| 2008/0226044 A1 | 9/2008 | Johnson |
| 2008/0260119 A1 | 10/2008 | Marathe et al. |
| 2008/0285438 A1 | 11/2008 | Marathe et al. |
| 2008/0285735 A1* | 11/2008 | Ravishankar et al. ... 379/207.02 |
| 2008/0294448 A1 | 11/2008 | Holtzclaw |
| 2009/0010217 A1* | 1/2009 | Belling ........................ 370/329 |
| 2009/0017794 A1 | 1/2009 | Wilson |
| 2009/0041223 A1 | 2/2009 | Agarwal et al. |
| 2009/0047980 A1 | 2/2009 | Wilson |
| 2009/0111489 A1 | 4/2009 | Wilson |
| 2010/0118866 A1 | 5/2010 | Cannon |
| 2010/0157986 A1* | 6/2010 | Rao et al. ..................... 370/352 |
| 2010/0158201 A1* | 6/2010 | Vijay Marathe et al. ...... 379/36 |
| 2010/0202446 A1 | 8/2010 | McCann et al. |
| 2011/0040884 A1 | 2/2011 | Khadri et al. |

FOREIGN PATENT DOCUMENTS

| | | |
|---|---|---|
| EP | 0 212 654 | 5/1987 |
| EP | 0 258 654 | 3/1988 |
| EP | 0 264 023 | 4/1988 |
| EP | 1 100 279 A2 | 5/2001 |
| EP | 1 217 816 A1 | 6/2002 |
| EP | 1 443 740 A1 | 8/2004 |
| EP | 1 705 885 A1 | 9/2006 |
| EP | 1 867 115 A2 | 9/2006 |
| GB | 2 382 267 | 5/2003 |
| IN | 273102 | 5/2016 |
| JP | 58-215164 | 12/1983 |
| JP | 62-200859 | 9/1987 |
| KR | 1020030025024 A | 3/2003 |
| KR | 10-2003-0066043 | 8/2003 |
| KR | 10-2006-0090378 | 8/2006 |
| WO | WO 84/01073 | 3/1984 |
| WO | WO 86/03915 | 7/1986 |
| WO | WO 88/00419 | 1/1988 |
| WO | WO 97/33441 | 9/1997 |
| WO | WO 99/14910 | 3/1999 |

(56) References Cited

FOREIGN PATENT DOCUMENTS

| | | |
|---|---|---|
| WO | WO 00/16583 | 3/2000 |
| WO | WO 00/35155 A1 | 6/2000 |
| WO | WO 01/06679 A1 | 1/2001 |
| WO | WO 01/20920 A1 | 3/2001 |
| WO | WO 01/56308 A2 | 8/2001 |
| WO | WO 02/07456 A1 | 1/2002 |
| WO | WO 02/39765 A1 | 5/2002 |
| WO | WO 02/063849 A1 | 8/2002 |
| WO | WO 02/078381 A1 | 10/2002 |
| WO | WO 03/001770 A2 | 1/2003 |
| WO | WO 2004/105405 A2 | 12/2004 |
| WO | WO 2006/031678 A2 | 3/2006 |
| WO | WO 2006/058275 A2 | 6/2006 |
| WO | WO 2006/102339 A2 | 9/2006 |
| WO | WO 2007/081934 A2 | 7/2007 |
| WO | WO 2007/141762 A1 | 12/2007 |
| WO | WO 2008/057259 A2 | 5/2008 |
| WO | WO 2008/130709 A2 | 10/2008 |
| WO | WO 2010/060082 A2 | 5/2010 |
| WO | WO 2010/083509 A2 | 7/2010 |

OTHER PUBLICATIONS

Notification of Transmittal of the International Search Report and the Written Opinion of the International Searching Authority, or the Declaration for International Application No. PCT/US2010/021374 (Aug. 19, 2010).
"BICC Architecture and BICC Protocol Details," Tekelec, p. 28-41 (2008).
"BICC Signaling Router (BSR) Reference Architecture (WP005274)," Tekelec, p. 2-91 (2008).
"GPRS Tunneling Protocol (GTP)," Trillium, Continous Computing, pp. 1-3 (Copyright 2007).
"Telecommunications and Internet Converged Services and Protocols for Advanced Networking (TISPAN); Interworking Between Session Initation Protocol (SIP) and Bearer Independent Call Control (BICC) Protocol or ISDN User Part (ISUP),"ETSI EN 383 001 V1.1.1 (Jun. 2006).
Jennings et al., "Session Initiation Protocol (SIP) URIs for Application such as Voicemail and Interactive Voice Response (IVR)," The Internet Society, RFC 4458 (Apr. 2006).
"Gateway Control Protocol: Version 3," Audiovisual and Multimedia Systems; Infrastructure of Audiovisual Services—Communication Procedures, ITU-T H.248.1 (Sep. 2005).
"Interworking Between Session Initiation Protocol (SIP) and Bearer Independent Call Control Protocol or ISDN User Part," ITU-T Q.1912.5, p. 1-101 (Mar. 2004).
"Services and Protocols for Advanced Networks (SPAN); Bearer Independent Call Control (BICC) Capability Set 2 (CS2); Protocol Specification," ETSI EN 302 213 V1.1.2 (Jan. 2004).
"Telecommunications and Internet Protocol Harmonization Over Networks (TIPHON) Release 4; Technology Mapping; Implementation of TIPHON Architecture Using BICC," ETSI TS 102 228 V4.1.1 (Nov. 2003).
Camarillo et al., "Mapping of Integrated Services Digital Network (ISDN) User Part (ISUP) Overlap Signalling to the Session Initiation Protocol (SIP)," Network Working Group, RFC 3578 (Aug. 2003).
"Series Q: Switching and Signalling; Broadband ISDN—Signalling ATM Adaptation Layer (SAAL); Signalling Transport converter on SCTP," ITU-T Q.2150.3 (Dec. 2002).
"Bearer Independent Call Bearer Control Protocol," ITU-T Q.1950, p. 1-96 (Dec. 2002).
Camarillo et al., "Integrated Services Digital Network (ISDN) User Part (ISUP) to Session Initiation Protocol (SIP) Mapping," Network Working Group, RFC 3398 (Dec. 2002).
Vemuri et al., "Session Initiation Protocol for Telephones (SIP-T): Context and Architectures," Network Working Group, RFC 3372 (Sep. 2002).
Chang "BICC Extension of SIP in Inter-Network Configuration," Internet Engineering Task Force, draft-chang-sipping-bicc-network-00.txt, pp. 1-17 (Mar. 2002).
Multiservice Switching Forum, "Implementation Agreement for BICC," MSF-IA-BICC.001-FINAL (Feb. 2002).
"Series Q: Switching and Signalling; Specification of Signalling Related to Bearer Independent Call Control (BICC); Bearer Independent Call Control Protocol (Capability Set 2): Basic Call Procedures," ITU-T Q.1902.4 (Jul. 2001).
"Bearer Independent Call Control Protocol (Capability Set 2) and Signalling System No. 7 ISDN User Part: Formats and Codes," ITU-T Q.1902.3, p. 1-141 (Jul. 2001).
"Bearer Independent Call Control Protocol (Capability Set 2) and Signaling System No. 7 ISDN user part: General Functions of Messages and Parameters," ITU-T Q.1902.2 (Jul. 2001).
"Bearer Independent Call Control Protocol (Capability Set 2): Functional Description," ITU-T Q.1902.1, p. 1-23 (Jul. 2001).
"Series Q: Switching and Signalling, Specification of Signalling Related to Bearer Independent Call Control (BICC); BICC Bearer Control Tunnelling Protocol," ITU-T Q.1990 (Jul. 2001).
"Series Q: Switching and Signalling; Specifications of Signalling System No. 7—ISDN User Part; Signalling System No. 7—Application Transport Mechanism: Bearer Independent Call Control (BICC); Amendment 1: Bearer Independent Call Control Capability Set 2," ITU-T Q.765.5 (Jul. 2001).
"Series Q: Switching and Signalling; Specifications of Signalling Related to Bearer Independent Call Control (BICC): Interworking Between Signalling System No. 7 ISDN User Part and the Bearer Independent Call Control Protocol," ITU-T Q.1912.1 (Jul. 2001).
"Series Q: Switching and Signalling; Interworking Between Selected Signalling Systems (PSTN Access, DSS1, C5, R1, R2, TUP) and the Bearer Independent Call Control Protocol," ITU-T Q.1912.2 (Jul. 2001).
"Signalling Transport Converter on MTP3 and MTP3b," ITU-T Q.2150.1 (May 2001).
"Generic Signalling Transport Service," ITU-T Q.2150.0 (May 2001).
"ITU-Q1970: Draft New ITU-T Recommendation Q.1970 BICC IP Bearer Control Protocol," Network Dictionary (2001).
"Gateway Control Protocol: Transport Over Stream Control Transmission Protocol (SCTP)," Series H: Audiovisual and Multimedia Systems; Infrastructure of Audiovisual Services—Communication Procedures, H.248.4 (Nov. 2000).
"Bearer Independent Call Control Protocol," ITU-T Q.1901 (Jun. 2000).
Sugano et al., "Presence Information Data Format for IMPP," Internet draft, draft-ietf-impp-pidf-01.text, Network Working Group, pp. 1-17 (Mar. 10, 2000).
"Signalling System No. 7—ISDN User Part Enhancements for the Support of Number Portability," ITU-T Q.769.1 (Dec. 1999).
"Signalling System No. 7—ISDN User Part Formats and Codes," ITU-T Q.763 (Dec. 1999).
"Signalling System No. 7—ISDN User Part General Functions of Messages and Signals," ITU-T Q.762 (Dec. 1999).
"Signalling System No. 7—ISDN User Part Functional Description," ITU-T Q.761 (Dec. 1999).
"Series Q: Switching and Signalling; Specifications of Signalling System No. 7—ISDN Supplementary Services; ISDN User Part Supplementary Services," ITU-T Q.730 (Dec. 1999).
De Ment, "The Evolution of Signaling," NMS Communications, p. 1-28 (Publication Date Unknown).
"Mobile Wireless Overview," Cisco IOS Mobile Wireless Configuration Guide, pp. MWC-1-MWC-8 (Publication Date Unknown).
Applicant-Initiated Interview Summary for U.S. Appl. No. 12/689,702 (Jun. 5, 2012).
Decision of Rejection for Chinese Patent Application No. 200780048418.8 (Jul. 4, 2012).
Second Office Action for Chinese Patent Application No. 200780048418.8 (Mar. 23, 2012).
Supplemental Notice of Allowability for U.S. Appl. No. 11/977,723 (Feb. 23, 2012).
Notice of Allowance and Fee(s) Due for U.S. Appl. No. 11/977,723 (Jan. 18, 2012).

(56) References Cited

OTHER PUBLICATIONS

Final Official Action for U.S. Appl. No. 11/977,723 (Sep. 29, 2011).
First Office Action for Chinese Patent Application No. 200780048418.8 (Jun. 15, 2011).
Official Action for U.S. Appl. No. 11/977,723 (Feb. 17, 2011).
Communication of European publication number and information on the application of Article 67(3) EPC for European Patent No. 2084861 (Jul. 8, 2009).
Notification of Transmittal of the International Search Report and the Written Opinion of the International Searchig Authority, or the Declaration for International Application No. PCT/US07/22664 (Mar. 14, 2008).
Roach, "Session Initiation Protocol (SIP)—Specific Event Notification," Network Working Group, RFC 3265 (Jun. 2002).
Final Office Action for U.S. Appl. No. 12/689,702 (Aug. 15, 2013).
Extended European Search Report for European Application No. 07839798.1 (Jun. 19, 2013).
Rejection Decision for Chinese Patent Application No. 200780048418.8 (Mar. 31, 2015).
Notification of Reexamination for Chinese Application No. 200780048418.8 (Jul. 23, 2014).
First Examination Report for Indian Patent Application No. 2935/CHENP/2009 (Jun. 23, 2014).
Advisory Action and Examiner-Initiated Interview Summary for U.S. Appl. No. 12/689,702 (Jan. 15, 2014).
Communication Pursuant to Article 94(3) EPC for European Patent Application No. 06 739 166.4 (Dec. 11, 2013).
Notice of Allowance and Fee(s) Due for U.S. Appl. No. 12/624,996 (Aug. 7, 2013).
Notice of Allowance and Fee(s) Due for U.S. Appl. No. 12/913,735 (Apr. 23, 2013).
Non-Final Office Action for U.S. Appl. No. 12/624,996 (Feb. 14, 2013).
Supplemental Notice of of Allowability for U.S. Appl. No. 12/913,735 (Jan. 11, 2013).
Notice of Allowance and Fee(s) Due for U.S. Appl. No. 12/913,735 (Nov. 16, 2012).
Non-Final Official Action for U.S. Appl. No. 12/624,996 (Sep. 21, 2012).
Commonly-assigned, co-pending U.S. Appl. No. 12/913,735 for "Methods, Systems, and Computer Program Products for Providing Telecommunications Services Between a Session Initiation Protocol (SIP) Network and a Signaling System 7 (SS7) Network," (Unpublished, filed Oct. 27, 2010).
Notice of Allowance and Fee(s) Due for U.S. Appl. No. 11/085,620 (Sep. 17, 2010).
European Search Report for European Patent No. 1867115 (Sep. 3, 2010).
Notification of Transmittal of the International Search Report and the Written Opinion of the International Searching Authority, or the Declaration for International Application No. PCT/US2009/065733 (Jun. 15, 2010).
Official Action for U.S. Appl. No. 11/085,620 (Apr. 15, 2010).
Official Action for Chinese Patent Application No. 200680017480.6 (Mar. 18, 2010).
"How Vanity Toll Free Numbers Work," http://www.mytollfree800number.com/vanity-numbers-800-toll-free-service.cfm, (copyright 2009) (downloaded from the Internet on Dec. 29, 2009).
"Toll-Free Strategy," http://www.tollfreestrategy.com/Vanity_toll-free_Numbers_Service.cfm, (downloaded from the Internet on Dec. 29, 2009).
Norris, "Toll Free Numbers and Advanced Routing," http://ezinearticles.com/?Toll-Free-Numbers-and-Advanced-Routing&id=699330, (article submitted on Aug. 22, 2007) (downloaded from the Internet on Dec. 29, 2009).
Final Official Action for U.S. Appl. No. 11/085,620 (Jun. 19, 2009).
Interview Summary for U.S. Appl. No. 11/085,620 (Apr. 30, 2009).
Official Action for U.S. Appl. No. 11/085,620 (Dec. 19, 2008).
Notification of European Publication Number and Information on the Application of Article 67(3) EPC for European Application No. 06 739 166.4 (Nov. 21, 2007).
Notification Concerning Transmittal of the International Preliminary Report on Patentability for International Application No. PCT/US2006/010263 (Oct. 25, 2007).
Notification of Transmittal of the International Search Report and the Written Opinion of the International Searching Authority, or the Declaration for International Application No. PCT/US06/10263 (Sep. 25, 2007).
"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).
"INAP Feature Module," Cisco MGC Software Release 9.5(2), pp. 1-16 (Dec. 3, 2003).
"Tekelec Introduces TekWare™ IN and TekWare Mediation," Tekelec, p. 1 (May 28, 2003).
"Tekelec Announces Advanced Signaling Architecture—TekWare," Tekelec, pp. 1-3 (Jun. 4, 2002).
Marshall et al., "SIP Extensions for Supporting Distributed Call State," SIP Working Group, Internet Draft, pp. 1-12 (Aug. 2001).
Redmill, "An Introduction to SS7," Booktrout Technology, pp. 1-26 (Jul. 2001).
"Integrated Services Digital Network (ISDN); Signalling System No. 7 (SS7); ISDN User Part (ISUP) Version 4 for the International Interface; Part 1: Basic Services," European Telecommunications Standards Institute, ETSI EN 300 356-1 V4.2.1, pp. 1-44 (May 2001).
Crowe, "Cellular Network Perspectives," Wireless Review, pp. 1-4 (Mar. 2001).
Gurbani et al., "Accessing IN services from SIP networks," Internet-Draft, pp. 1-20 (Feb. 2001).
"Interface Recommendation for Intelligent Network Capability Set 3: SCF-SSF Interface," ITU-T, Q.1238.2, pp. 7-9, 73-76, and 85-101 (Jun. 2000).
"Signalling System No. 7—ISDN User Part Functional Description," ITU-T, Q.762 (Dec. 1999).
"Signalling System No. 7—ISDN User Part Functional Description," ITU-T, Q.761 (Dec. 1999).
"Integrated Services Digital Network (ISDN); Signalling System No. 7; Signalling Connection Control Part (SCCP), (connectionless and connection-oriented) to Support International Interconnection; Part 1: Protocol Specification," European Telecommunications Standards Institute, ETSI EN 300 009-1, V1.4.2. pp. 1-18 (Nov. 1999).
Haerens, "Intelligent Network Application Part (INAP) Support of the SIP/SDP Architecture," SIP Working Group, Internet Draft, pp. 1-12 (Oct. 1999).
Liao et al., "SS7-TCAP/IP Interworking," Internet Engineering Task Force, pp. 1-14 (Mar. 1999).
Handley et al., "SIP: Session Initiation Protocol," Network Working Group, RFC 2543 (Mar. 1999).
Aitken, "Signalling Relay Intelligence," Logica Aldiscon, pp. 1-11 (1999).
"Eagle STP Platform," Tekelec, Publication 908-0126-01, Rev. A, pp. 1-4 (Copyright 1997).
Advisory Action Before the Filing of an Appeal Brief for U.S. Appl. No. 12/625,017 (Dec. 4, 2015).
Hearing Notice for Indian Application No. 2935/CHENP/2009 (Nov. 3, 2015).
Notice of Allowance and Fee(s) Due and Examiner-Initiated Interview Summary for U.S. Appl. No. 12/689,702 (Aug. 19, 2015).

\* cited by examiner

HEADER SECTION
id = 41555;
qr = 1; opcode = QUERY; aa = 1; tc = 0; rd = 1;
ra = 1; ad = 0; cd = 0; rcode = NOERROR;
qdcount = 1; ancount = 2; nscount = 1; arcount = 1;

QUESTION SECTION (1 record)
1.4.3.2.4.3.2.4.3.2.1.e164.arpa.    IN    NAPTR

ANSWER SECTION (3 records)
5.1.0.7.5.4.3.9.1.9.e164.arpa.  0  IN  NAPTR  5688  39270  "U"  "sip+E2U"
"!^.*$!SIP:+12342342341/PPMN@sip.mycarrier.com!" .

AUTHORITY SECTION (1 record)
1.e164.arpa.    0   IN   NS   cary-c.

ADDITIONAL SECTION (0 record)

FIG. 5

METHODS, SYSTEMS, AND COMPUTER READABLE MEDIA FOR PROVIDING E.164 NUMBER MAPPING (ENUM) TRANSLATION AT A BEARER INDEPENDENT CALL CONTROL (BICC) AND/OR SESSION INTIATION PROTOCOL (SIP) ROUTER

PRIORITY CLAIM

This application is a continuation-in-part of U.S. patent application Ser. No. 12/689,702 filed Jan. 19, 2010, which claims the benefit of U.S. Provisional Patent Application Ser. No. 61/145,517, filed Jan. 16, 2009. This application further claims the benefit of U.S. Provisional Patent Application Ser. No. 61/318,233 filed Mar. 26, 2010. The disclosures of each of the applications referenced in this paragraph are incorporated herein by reference in their entireties.

TECHNICAL FIELD

The subject matter described herein relates to the bearer independent call control protocol. More particularly, the subject matter described herein relates to methods, systems, and computer readable media for providing ENUM translation at a BICC and/or SIP router.

BACKGROUND

The BICC protocol is a signaling protocol based on narrowband-ISDN user part (N-ISUP) that is used to support narrowband integrated services digital network (ISDN) service over a broadband backbone network. BICC supports narrowband ISDN services independently of bearer and signaling message transport technology. The BICC architecture also separates the call control function from the bearer control function.

SIP is an application-layer control protocol for creating, modifying, and terminating sessions between communicating parties. The sessions may include Internet multimedia conferences, Internet telephone calls, and multimedia distribution. Members in a session can communicate via unicast, multicast, or a mesh of unicast communications.

In order to facilitate the integration of BICC and/or SIP signaling in a given network, communications between BICC, SIP, and/or legacy nodes need to be possible. Accordingly, there exists a need for methods, systems, and computer readable media for providing ENUM translation at a BICC and/or SIP router.

SUMMARY

The subject matter described herein includes methods, systems and computer readable media for providing E.164 number mapping (ENUM) translation at a bearer independent call control (BICC) and/or session initiation protocol (SIP) router. One aspect of the subject matter described herein includes a system for providing ENUM translation. The system includes an ENUM database. The system also includes a signaling router for receiving a bearer independent call control (BICC) signaling message that includes a first call party identifier, for obtaining, from the ENUM database, a first SIP address associated with the first call party identifier, for generating a first SIP signaling message that includes the first SIP address, and for routing the first SIP signaling message to a destination SIP node.

According to another aspect, the subject matter described herein includes a method for providing ENUM translation. The method occurs at a signaling router. The method includes receiving a first bearer independent call control (BICC) signaling message that includes a first call party identifier. The method also includes obtaining, from an ENUM database, a first SIP address associated with the first call party identifier. The method further includes generating a first SIP signaling message that includes the first SIP address and routing the first SIP signaling message to a destination SIP node.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

As used herein, the term "ENUM translation" refers to translating or mapping between non-SIP identifiers (e.g., E.164 formatted telephone numbers and telephone numbers formatted by other standards) and SIP identifiers (e.g., universal resource identifiers (URIs) and Internet protocol (IP) addresses).

BRIEF DESCRIPTION OF THE DRAWINGS

Preferred embodiments of the subject matter described herein will now be explained with reference to the accompanying drawings, of which.

DETAILED DESCRIPTION

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
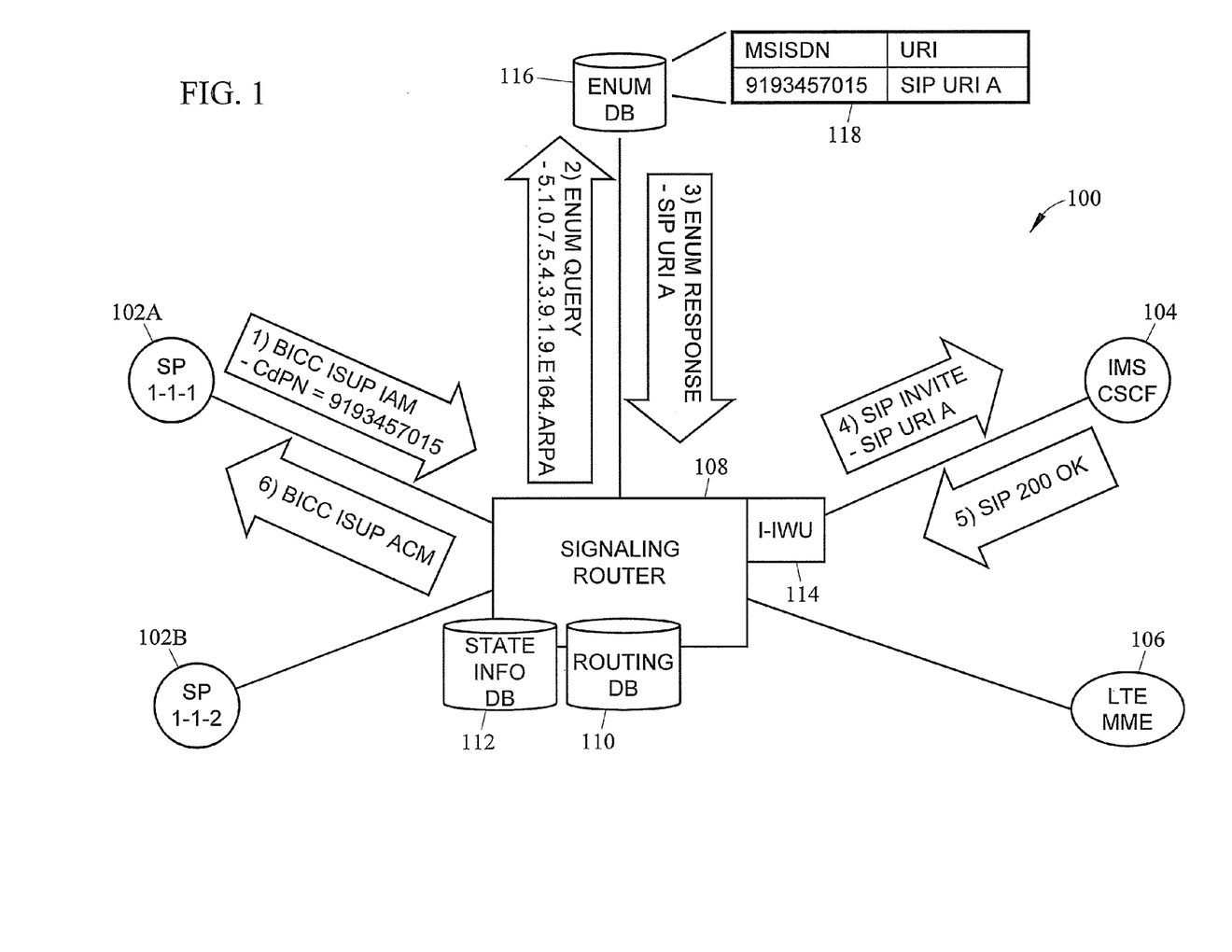
FIG. 1 is a network diagram illustrating ENUM translation according to an embodiment of the of the subject matter described herein.

FIG. 1 is a diagram of a communications network 100. Communications network 100 may include a signaling router (SR) 108, BICC-capable signaling points (SPs) 102A-B, SIP or IMS nodes, such as an IMS call signaling control function (CSCF) 104, and 3rd generation partnership project (3GPP) long term evolution (LTE) nodes, such as a mobility management entity (MME) 106.

SPs 102A-B may be any nodes capable of communicating using BICC signaling messages. Exemplary SPs 102 may include SS7 signaling points (SPs), media gateway controllers (MGCs), mobile switching centers (MSCs), Class 5 end offices, softswitches, tandem switches, packet switches, time division multiplexed (TDM) switches, session border control nodes, gateway nodes, service control points (SCPs), application servers, voice mail servers, interactive voice response (IVR) servers, and the like. SPs 102A-B may be associated with point codes. For example, each SP 102 may be identified by a unique point code and a destination point code (DPC) may be used in addressing BICC signaling messages for delivery to a given destination BICC node.

CSCF 104 represents a node capable of communicating using SIP signaling messages. Other exemplary SIP nodes may include SIP proxy servers, SIP application servers, MMEs, MSCs, and the like. MME 106 represents an LTE node capable of communicating using SIP and Diameter signaling messages. Other exemplary LTE nodes may include home subscriber servers (HSSs) and/or authentication, authorization, and accounting (AAA) server, a Bearer Binding and Event Reporting Function (BBERF), a policy charging enforcement function (PCEF), a policy charging and rules function (PCRF), a subscriber profile repository (SPR), a serving gateway (SGW), a packet data network (PDN) gateway, a Diameter signaling router (DSR), and the like. LTE nodes and/or SIP nodes may use one or more uniform resource identifiers (URIs) for identification and/or addressing purposes. For example, URIs may be IP addresses, email addresses, URLs, or other identifiers.

SR 108 may be any suitable entity for routing and/or relaying signaling messages, e.g., SIP, BICC, Diameter, and signaling system number 7 (SS7) messages. For example, SR 108 may be a BICC-capable router that can provide a centralized routing function, among other things, for BICC-capable call control elements (e.g., BICC-capable SPs) in a network. In another example, SR 108 may be a SIP router for routing and/or relaying SIP messages. In yet another example, SR 108 may be a signaling routing or relaying node that includes one or more interworking functions. The interworking functions may allow SR 108 to communicate with various nodes in communications network 100. For example, SR 108 may include an IMS-interworking unit (I-IWU) 114. I-IWU 114 may be adapted to translate BICC messages to equivalent SIP messages and vice-versa thereby generally facilitating signaling communications between BICC and SIP signaling points.

SR 108 may include or have access to various databases, such as a state information database (SIDB) 112, a routing database (RDB) 110, and an ENUM database 116. SIDB 112 may be any suitable entity (e.g., a storage device, memory, or non-transitory computer readable medium) for storing or maintaining state information. For example, call instance codes (CICs) may be associated with BICC sessions or call legs. SIP call identifiers (CIDs) may be associated with SIP sessions or call legs. SIDB 112 may store associations between CICs and CIDs relating to the same session or communication. SIDB 112 may also store source and/or destination node addresses associated with sessions. Additional state information may also be maintained related to the call or signaling session. For example, the additional state information may include available CICs at each SP 102A-B, congestion states for each node (e.g., SP 102B or CSCF 104) associated with SR 108, and relative traffic load of each node associated with SR 108.

RDB 110 may be any suitable entity for storing or maintaining routing information. For example, information stored at RDB 110 may be used by a routing module to perform routing for BICC signaling messages and/or other signaling messages. In one embodiment, RDB 110 may include a central routing table and a status table among other things.

A routing table may contain information about how to process given signaling messages. For example, the routing table may contain three fields: a subscriber identifier field which contains a subscriber or device identifier, such as a called party number (CdPN), calling party number (CgPN) or a portion thereof, a primary node field which contains a destination point code (DPC), universal resource identifier (URI), or other information that identifies a primary node which handles calls for that number, and a secondary node field which contains a DPC, URI, or other information that identifies a primary node which handles calls for that number if the primary node cannot (e.g., if is down or congested). A status table may contain information on whether a given DPC (i.e., SP) is available to handle signaling messages and whether any associated CICs are available. SR 108 may use these databases and other maintained information to determine how signaling traffic should be routed and/or load balanced among nodes in network 100.

ENUM database 116 may be any suitable entity for storing or maintaining ENUM translation information. ENUM database 116 may also include functionality for performing ENUM translation transactions or dips. For example, ENUM database 116 may be used for translating a telephone number into a URI (e.g., an IP address) that can be used in SIP or Internet communications. In another example, ENUM translation information may be used for translating a URI or an IP address into a telephone number for use in BICC or SS7 communications. In some embodiments, ENUM database 116 may be associated with a stand-alone node or computing platform (e.g., an ENUM server). In other embodiments, ENUM database 116 may be integrated with or co-located at SR 108.

In one embodiment, ENUM database 116 may include an ENUM table 118. ENUM table 118 may store or maintain associations between phone numbers or device identifiers (e.g., E.164 formatted telephone numbers, mobile subscriber integrated services digital network numbers (MSISDNs), or international mobile subscriber identities (IMSIs)) and SIP identifiers (e.g., universal resource identifiers (URIs), Internet protocol (IP) addresses, domain name system (DNS) addresses, or an email addresses). For example, ENUM database 116 may receive an ENUM query message from SR 108. The ENUM query message may include CdPN or MSISDN information. ENUM database 116 may query, using the CdPN or MSISDN information, ENUM table 118 for determining an associated SIP URI. If a match is found (e.g., if ENUM table 118 includes an entry with the same MSISDN as the ENUM query message), an associated SIP URI may be determined and sent back to SR 108 in an ENUM answer message. If a match is not found, ENUM database 116 may not respond or may send a response indicating that an associated SIP URI was not found.

Referring to the example illustrated in FIG. 1, a call indication (e.g., dialed digits) originating from a calling party may reach SP 102A in communications network 100. In response, a BICC call setup signaling message (e.g., an ISDN User Part (ISUP) initial address message (IAM)) may be generated by SP 102A. The BICC message may include a call party number or identifier, such as CdPN information (e.g., "9193457015") or CgPN information. An exemplary call party number may be an E.164 formatted MSISDN or a telephone number that is formatted according to a different standard.

In step 1, the BICC call setup signaling message may be sent from SP 102A to SR 108. The BICC call setup signaling message may be received at SR 108 and the CdPN information may be examined. SR 108 may generate an ENUM query message that includes the CdPN information or a variation thereof. For example, generating an ENUM query message may include formatting or changing CdPN information, e.g., such that the CdPN information is formatted similar to a DNS address. For instance, a CdPN of "9193457015" may be reformatted as "5.1.0.7.5.4.3.9.1.9.E164.arpa" in the ENUM query message. In this example, CdPN information is reversed and each digit is separated by a period. Additionally, after the last digit of the CdPN and its corresponding period, a format type identifier (e.g., "E164"), a period, and a generic domain identifier (e.g., "arpa") may be added.

In step 2, the ENUM query message may be sent to an external ENUM database 116. ENUM database 116 may be integrated with and/or co-located at an ENUM server. In an alternate implementation, ENUM database 116 may be a component of SR 108. ENUM database 116 and/or server may process the ENUM query message. For example, ENUM database 116 may use the CdPN information to identify a relevant entry in ENUM table 118 that contains associated SIP identifiers. If a relevant entry is found, ENUM database 116 and/or server may generate an ENUM answer message that includes one or more SIP identifiers (e.g., URIs) associated with the CdPN information.

In step 3, the ENUM answer message including URI information may be sent from ENUM database 116 to SR 108. SR 108 may receive the ENUM answer message and examine and/or extract the URI information. SR 108 may generate a SIP signaling message (e.g., a SIP INVITE message) associated with the BICC call setup signaling message. The SIP signaling message may include the URI information, or a portion thereof, provided in the ENUM answer message. For example, I-IWU 114 at SR 108 may generate the SIP INVITE message that includes the received URI information as a destination address and a URI associated with SR 108 as the origination address.

SR 108 may maintain state information associated with the BICC-SIP translation (e.g., at SIDB 112). The state information may include a mapping of the CdPN information to the URI information, e.g., as determined from the ENUM dip. The state information may be use during the routing or processing of subsequent BICC and SIP messages associated with the communication and/or session.

In step 4, the SIP signaling message including the URI information may be sent to CSCF 104. CSCF 104 may receive the SIP signaling message and forwards the message to a destination.

In step 5, a SIP signaling message (e.g., a SIP 200 OK message) may be sent from CSCF 104 to SR 108. The SIP signaling message may be for indicating that the SIP signaling message has been successfully sent (e.g., that the call party has been reached). SR 108 (e.g., using I-IWU 114 and SIDB 112) may generate a BICC signaling message associated with the SIP signaling message. The BICC signaling message may include CdPN information associated with the URI information in the SIP signaling message. For example, I-IWU 114 at SR 108 may generate a BICC ISUP answer call message (ACM). The BICC ACM may include the CdPN information and CgPN information associated with the caller. The BICC ACM may be for indicating that the call party has been reached.

In step 6, the BICC call setup signaling message may be sent from SR 108 to SP 102A. SP 102A may receive the message. The caller may receive indication that a call party has been reached (e.g., via ringing).

Figure 2:
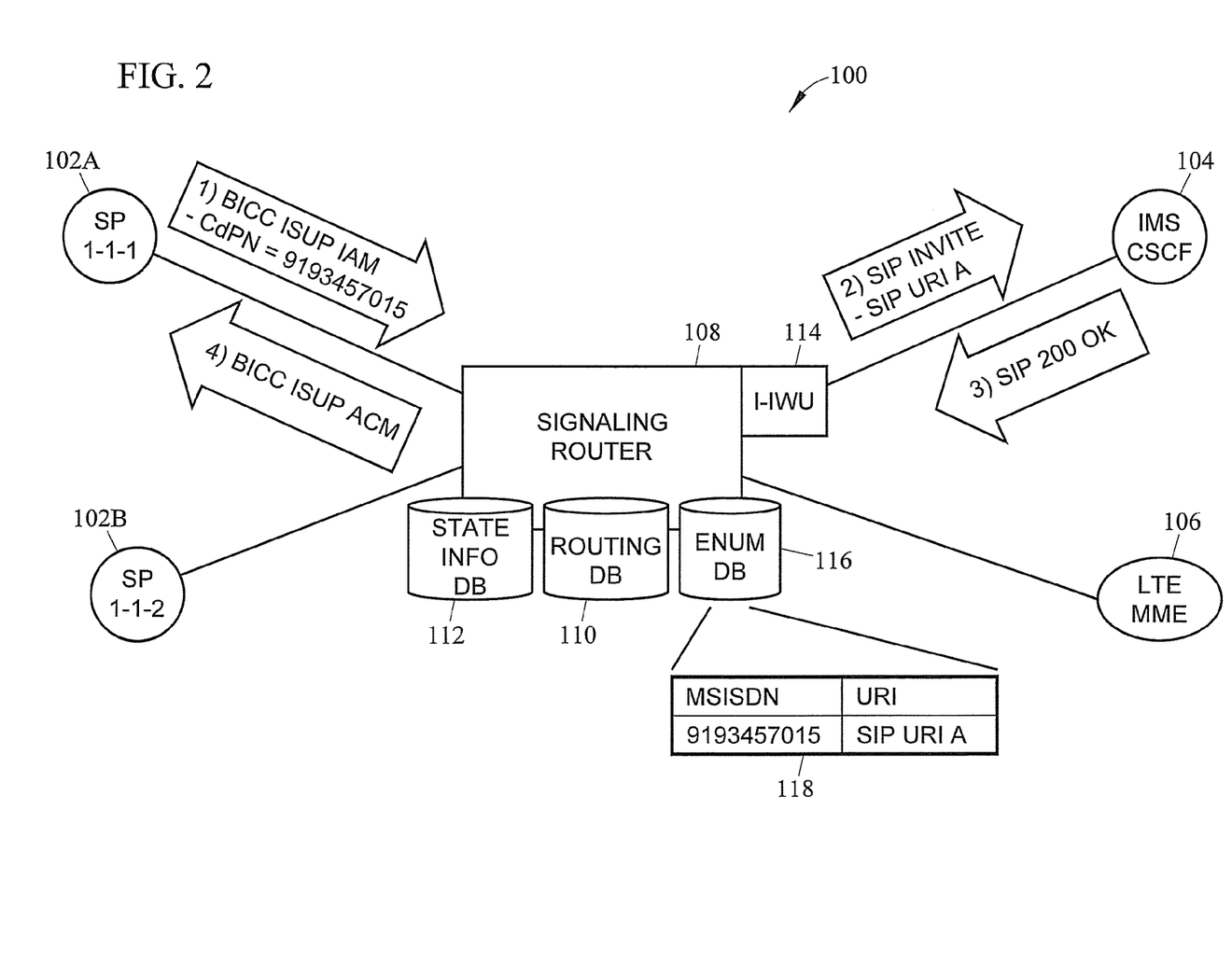
FIG. 2 is a network diagram illustrating ENUM translation according to another embodiment of the of the subject matter described herein.

FIG. 2 is a diagram of communications network 100 according to another embodiment of the subject matter described herein. Except as disclosed herein, communications network 100 is essentially the same as described in related to FIG. 1. In this embodiment, ENUM database 116 may be integrated with or co-located at SR 108. As such, querying ENUM database 116 and/or ENUM table 118 may involve fewer signaling messages being sent via communications network 100.

Referring to the example illustrated in FIG. 2, a call indication (e.g., dialed digits) originating from a calling party may reach SP 102A in communications network 100. In response, a BICC call setup signaling message (e.g., BICC ISUP IAM) may be generated by SP 102A. The BICC message may include a call party number or identifier, such as CdPN information stored in a CdPN parameter. An exemplary call party number may be an E.164 formatted MSISDN or a telephone number that is formatted according to a different standard.

In step 1, the BICC call setup signaling message may be sent from SP 102A to SR 108. The BICC call setup signaling message may be received at SR 108 and the CdPN information may be examined. Using the CdPN information, SR 108 may query ENUM database 116 and/or ENUM table 118. For example, a call party number may be used to identify an entry in ENUM table 118 that includes associated SIP URIs and/or IP addresses.

SR 108 may generate a SIP signaling message (e.g., a SIP INVITE message) associated with the BICC call setup signaling message. The SIP signaling message may include the information determined from the ENUM dip, e.g., a SIP URI or IP address. For example, I-IWU 114 at SR 108 may generate an SIP INVITE message that includes URI information retrieved from ENUM database 116.

SR 108 may maintain state information associated with the BICC-SIP translation (e.g., at SIDB 112). The state information may include a mapping of the CdPN information to the URI information, e.g., as determined from the ENUM dip. The state information may be use during the routing or processing of subsequent BICC and SIP messages associated with the communication and/or session.

In step 2, the SIP signaling message including the URI information may be sent to CSCF 104. CSCF 104 may receive the SIP signaling message and forwards the message to a destination.

In step 3, a SIP signaling message (e.g., a SIP 200 OK message) may be sent from CSCF 104 to SR 108. The SIP signaling message may be for indicating that the SIP signaling message has been successfully sent. SR 108 (e.g., using I-IWU 114 and SIDB 112) may generate a BICC signaling message associated with the SIP signaling message. The BICC signaling message may include CdPN information associated with the URI information in the SIP signaling message. For example, I-IWU 114 at SR 108 may generate a BICC ISUP ACM. The BICC ACM may include the CdPN information and CgPN information associated with the caller. The BICC ACM may be for indicating that the call party has been reached.

In step 4, the BICC call setup signaling message may be sent from SR 108 to SP 102A. SP 102A may receive the message. The caller may receive indication that a call party has been reached (e.g., via ringing).

Figure 3:
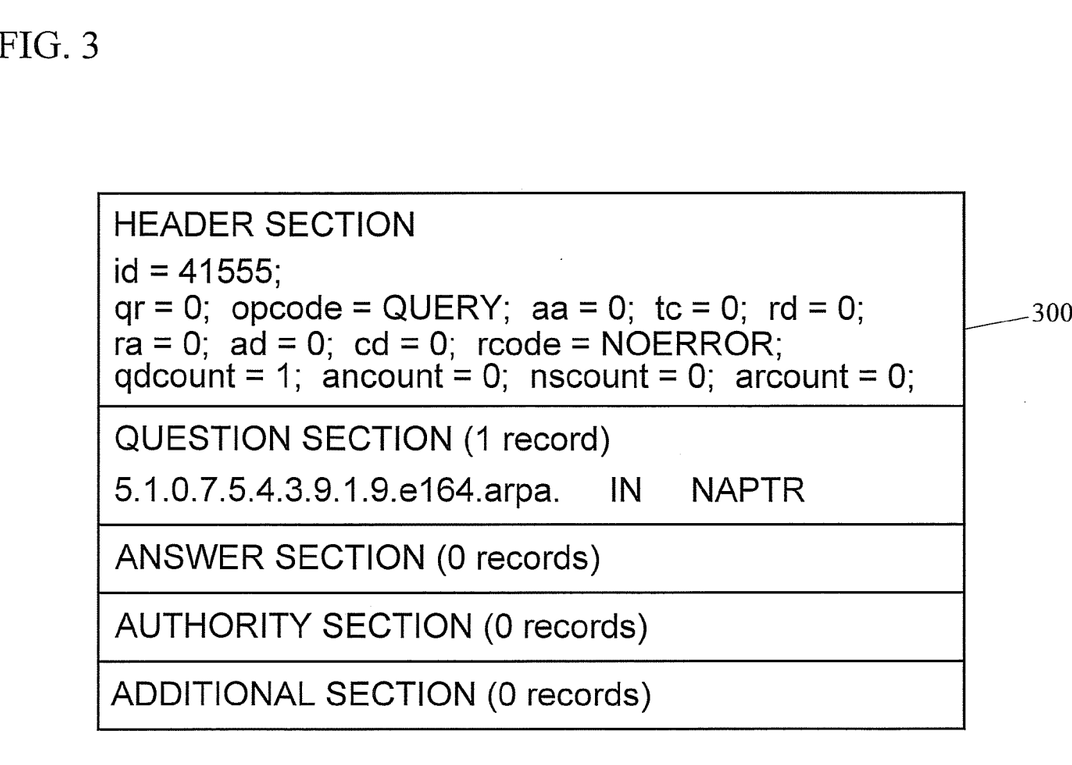
FIG. 3 is a diagram illustrating exemplary ENUM query information according to an embodiment of the subject matter described herein.

FIG. 3 is a diagram illustrating exemplary ENUM query information according to an embodiment of the subject matter described herein. Referring to FIG. 3, an ENUM query message 300 may include various sections or portions for storing ENUM related information. ENUM related information may include parameters, flags, identifiers, resource records (e.g., name authority pointer (NAPTR) records), and other information for performing an ENUM translation transaction or ENUM dip.

In this embodiment, ENUM query message 300 may include a header section, a question section, an authority section, and an additional section. The header section of ENUM query message 300 may include a transaction identification parameter (id), a query/response parameter (qr), an operation code parameter (opcode), an authoritative answer parameter (aa), a truncated parameter (tc), a recursive desired parameter (rd), a recursive available parameter (ra), an authenticated data parameter (ad), a checking disabled parameter (cd), and/or return code parameter (rcode). An id may include a value used to identify associated responses and answer messages (e.g., both may have the same ID value). A qr may include a value (e.g., '0'=query and '1'=response) for indicating whether a message is a query or a response. An opcode may include a value or other information for indicating a particular type of ENUM message. For example, as depicted in FIG. 3, ENUM query message 300 includes a qr of "0" and an opcode of "QUERY" in the header section.

An aa may include a value (e.g., '0'=not authoritative and '1'=authoritative) for indicating whether a responding name server (e.g., ENUM database 116) is an authority for the domain name (e.g., the formatted CdPN information) in the question section. A tr may include a value (e.g., '0'=not truncated and '1'=truncated) for indicating whether a message is truncated. A rd may include a value (e.g., '0'=recursive not desired and '1'=recursive desired) for indicating whether a name server is to pursue the query recursively (e.g., in searching a data structure for entries). An ra may include a value (e.g., '0'=recursive query support not available and '1'=recursive query support available) for indicating whether a name server is capable of pursuing a query recursively. An ad may include a value (e.g., '0'=not authenticated and '1'=authenticated) for indicating whether all data in the message has been authenticated (e.g., by a name server using local security policies). A cd may include a value (e.g., '0'=checking is disabled and '1'=checking is enabled) for indicating whether a name server can avoid performing signature validation. An rcode may include a value or other information for indicating the outcome of a particular message.

ENUM query message 300 may also include parameters, such as a question section counter parameter (qdcount), an answer section counter parameter (ancount), an authority section counter parameter (nscount), and an additional section counter parameter (arcount), for indicating number of entries, e.g., resource records or other data structures, in particular message sections. For example, a qdcount may include a value for indicating the number of resource records in the question section of ENUM query message 300. An ancount may include a value for indicating the number of resource records in the answer section of ENUM query message 300. An nscount may include a value for indicating the number of resource records in the authority section of ENUM query message 300. An arcount may indicate the number of resource records in the additional section of ENUM query message 300.

As stated above, ENUM query message 300 may include a question section for storing questions. For example, a question section may include call party information used for querying ENUM database 116 to find an associated SIP identifier. ENUM query message 300 may include an answer section for storing answers to questions. For example, an answer section may include a list of SIP identifiers associated with a particular question. ENUM query message 300 may include an authority section for storing name server information. For example, an authority section may include a list of name servers that provided answers. ENUM query message 300 may include an additional section for storing additional information. For example, an additional section may include additional information (e.g., glue records to break circular dependency created by delegating name servers).

While ENUM query message 300 may include an answer section, authority section, and an additional section, it will be appreciated that typical ENUM query messages 300 may contain little, if any, relevant information in these sections. Instead, ENUM answer messages may use such sections for providing relevant ENUM translation information. For example, after an ENUM database 116 has been queried, ENUM answer messages may include resource records in an answer section that contains SIP identifiers associated with call party information in the question section of ENUM query message 300.

Figure 4:
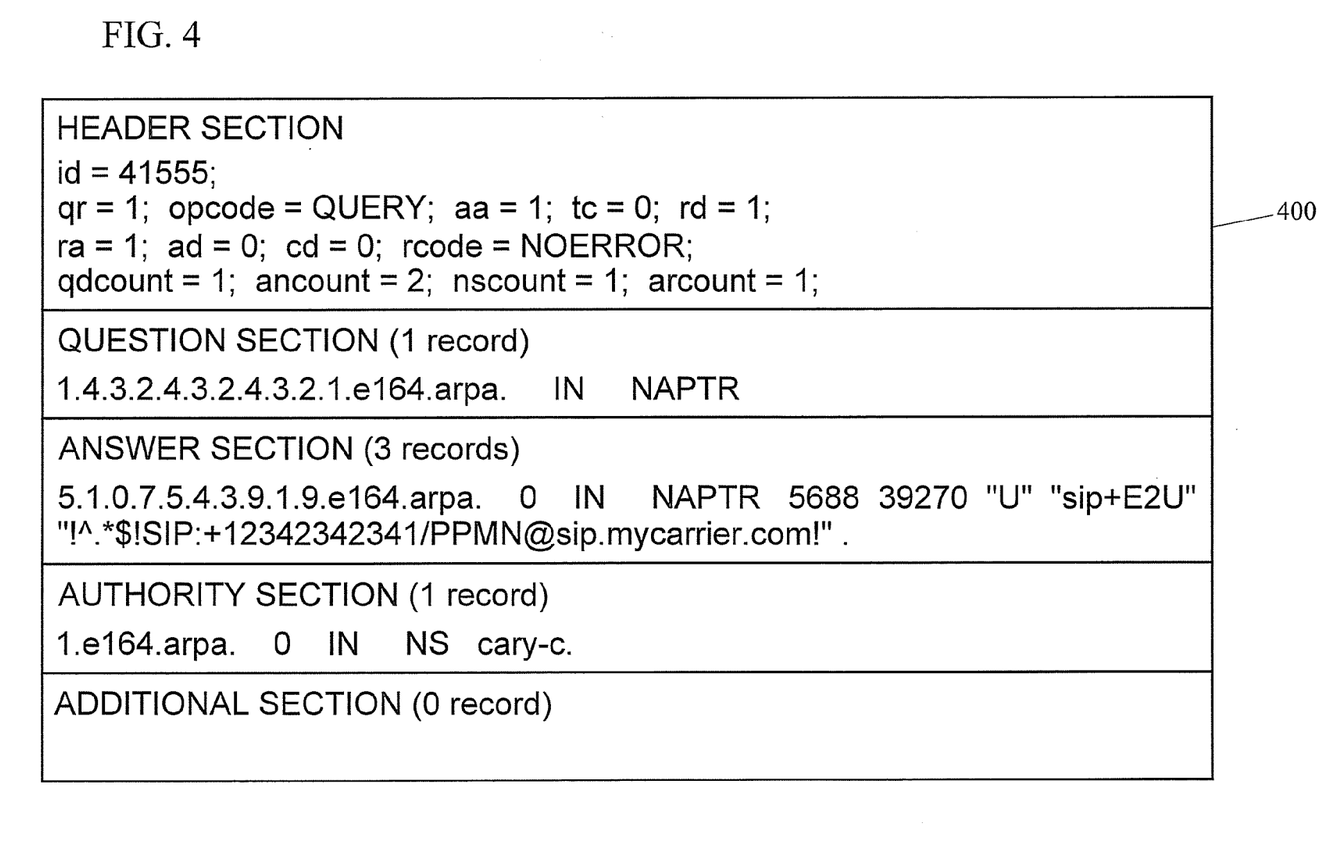
FIG. 4 a diagram illustrating exemplary ENUM answer information according to an embodiment of the subject matter described herein.

FIG. 4 a diagram illustrating exemplary ENUM answer information according to an embodiment of the subject matter described herein. Except as described herein, exemplary ENUM answer message 400 may include essentially the same parameters, counters, and sections as described in reference to ENUM query message 300. In this embodiment, ENUM answer message 400 may be associated with ENUM query message 300, e.g., as determined by each message having the id value of "41555" in their header sections.

ENUM answer message 400 may include parameters, counters, and/or sections that are different and/or additional to related ENUM query message 300. For example, as illustrated in FIG. 4, ENUM answer message 400 may include one or more resource records in its answer section. Each resource record in the answer section of ENUM answer message 400 may include a SIP identifier (e.g., a SIP URI) that is associated with a resource record in the question section of ENUM answer message 400 or a related message (e.g., ENUM query message 300. Further, ENUM answer message 400 may include one or more resource records providing information associated with ENUM database 116 in an authority section. For example, as illustrated in FIG. 4, a resource record in the authority section of ENUM answer message 400 may include a DNS address for ENUM database 116 and geographical location information.

Figure 5:
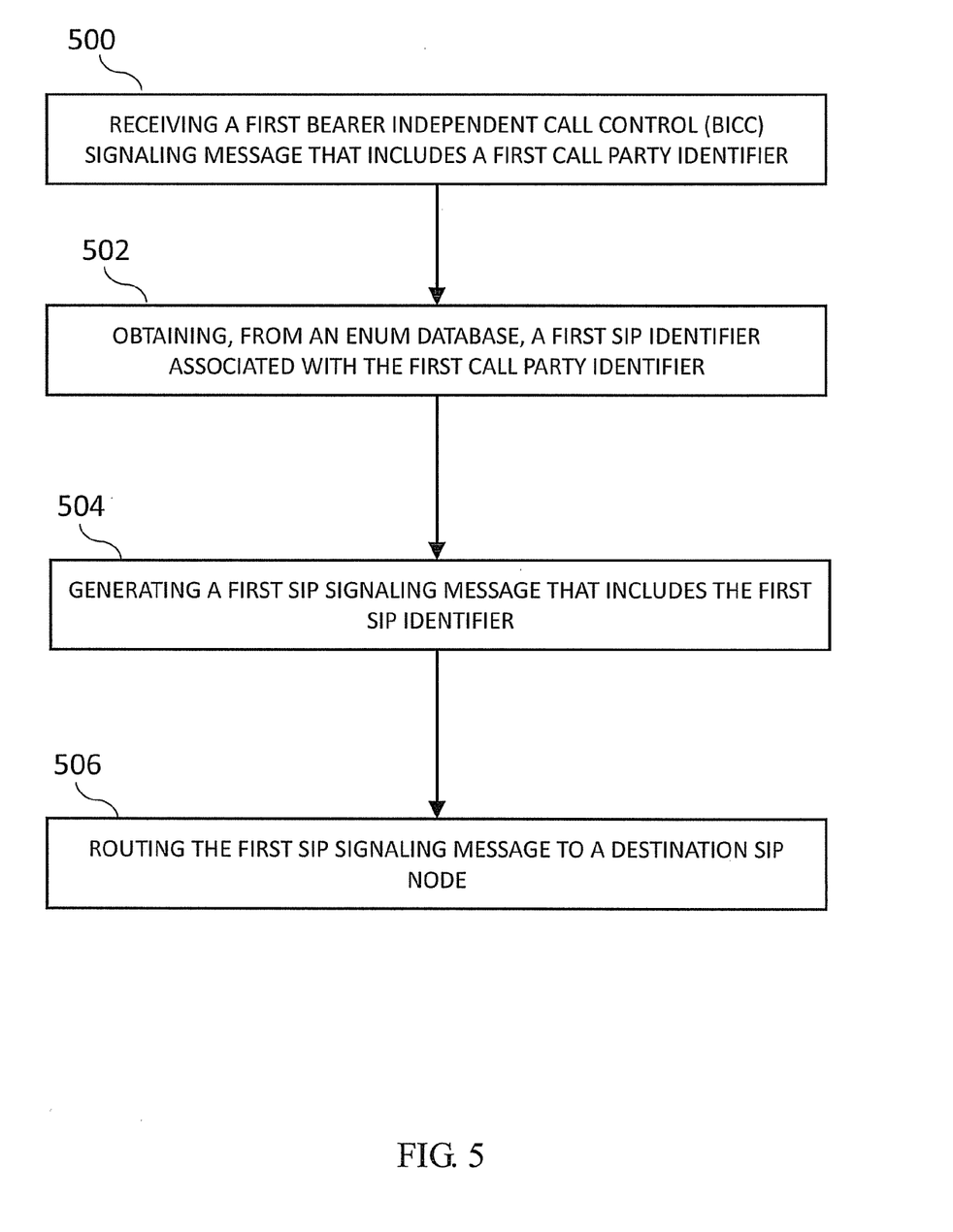
FIG. 5 is a flow chart illustrating exemplary steps for performing ENUM translation according to an embodiment of the subject matter described herein.

FIG. 5 is a flow chart illustrating exemplary steps for performing ENUM translation according to an embodiment of the subject matter described herein. In this embodiment, one or more exemplary steps described herein may be performed at or performed by a SR 108. In some embodiments, SR 108 may include functionality (e.g., I-IWU 114) for communicating between various protocols, e.g., BICC signaling messages and SIP signaling messages.

In FIG. 5, in step 500, a first BICC signaling message that includes a first call party identifier may be received. For example, as illustrated in FIG. 1, a BICC ISUP IAM may be received at SR 108. The BICC ISUP IAM may include a CdPN parameter with an E.164 formatted telephone number as its value. In other examples, a call party identifier may be a dialed number or other information in a different format, such as an E.212 formatted IMSI value.

In step 502, a first SIP identifier associated with the first call party identifier may be obtained from an ENUM database. For example, as illustrated in FIG. 1, SR 108 may generate an ENUM query message that includes call party information (e.g., a DNS-formatted telephone number). SR 108 may send the ENUM query message to an external ENUM database 116. ENUM database 116 may process the ENUM query message and send an ENUM answer message that includes one or more SIP identifiers to SR 108.

In step 504, a first SIP signaling message that includes the first SIP identifier may be generated. For example, as illustrated in FIG. 1, SR 108 and/or I-IWU 114 may generate a SIP INVITE message that includes a SIP identifier from an ENUM dip.

In step 506, the first SIP signaling message may be routed to a destination SIP node. For example, as illustrated in FIG. 1, a SIP INVITE message may be sent to CSCF 104. CSCF 104 may receive the SIP INVITE message and attempt to reach the called party.

In one embodiment, SR 108 may receive a second SIP message associated with the first SIP message. The second SIP message may include a second SIP identifier. For example, as illustrated in FIG. 1, a SIP 200 OK message may be sent from CSCF 104 to SR 108. SR 108 may determine a call party identifier associated with the SIP identifier in the SIP OK message. For example, SR 108 may use state information at SIDB 112 to determine that a second SIP identifier is associated with a second call party identifier (e.g., a MSISDN). After determining the second call party identifier, SR 108 may generate a second BICC signaling message that includes the second call party identifier and may route the second BICC signaling message towards a BICC node (e.g., SP 102A).

In one embodiment, the second SIP identifier may be associated with the same subscriber or device as the first SIP identifier and the second call party identifier may be the same as the first call party identifier. In another embodiment, the second SIP identifier may be the same as the first SIP identifier and the second call party identifier may be the same as the first call party identifier.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for providing E.164 number mapping (ENUM) translation, the system comprising:
   an ENUM database for maintaining associations between session initiation protocol (SIP) identifiers and call party identifiers;
   a state information database for maintaining associations between call instance codes (CICs) and SIP call identifiers (CIDs) associated with related communications; and
   a signaling router for receiving a first bearer independent call control (BICC) signaling message that includes a first call party identifier and a CIC, for obtaining, from the ENUM database, a first SIP identifier associated with the first call party identifier, for querying, using the CIC, a state information database for identifying a SIP call identifier (CID) associated with the CIC, wherein the state information database maintains associations between CICs and CIDs associated with related communications; for generating a first SIP signaling message that includes the first SIP identifier and the SIP CID, wherein the CIC identifies a BICC signaling session associated with the first BICC signaling message and wherein the SIP CID identifies a SIP session associated with the BICC signaling session, wherein the signaling router is configured for receiving a second SIP message associated with the first SIP message, wherein the second SIP message includes a second SIP identifier, for determining a second call party identifier associated with the second SIP identifier, for generating a second BICC signaling message that includes the second call party identifier, and for routing the second BICC signaling message towards a BICC node.

2. The system of claim 1 wherein obtaining, from an ENUM database, a first SIP identifier associated with the first call party identifier includes sending a query message that includes call party information to the ENUM database and receiving an answer message that includes the first SIP identifier.

3. The system of claim 1 wherein the first call party identifier is an E.164 formatted telephone number, a mobile subscriber integrated services digital network number (MSISDN), or an international mobile subscriber identity (IMSI).

4. The system of claim 1 wherein the first SIP identifier is a uniform resource identifier (URI), an Internet protocol (IP) address, a domain name system (DNS) address, or an email address.

5. The system of claim 1 wherein the signaling router includes an interworking unit (IWU) for BICC-SIP interworking.

6. The system of claim 1 wherein the ENUM database is external to the signaling router.

7. The system of claim 1 wherein the ENUM database is internal to the signaling router.

8. The system of claim 1 wherein determining the second call party identifier associated with the second SIP identifier includes querying maintained state information.

9. The system of claim 1 wherein the second SIP identifier is associated with the same subscriber or device as the first SIP identifier and wherein the second call party identifier is the same as the first call party identifier.

10. The system of claim 1 wherein the second SIP identifier is the same as the first SIP identifier and wherein the second call party identifier is the same as the first call party identifier.

11. A method for providing E.164 number mapping (ENUM) translation, the method comprising:
   at a signaling router:
      receiving a first bearer independent call control (BICC) signaling message that includes a first call party identifier and a call instance code (CIC);
      obtaining, from an ENUM database, a first SIP identifier associated with the first call party identifier;
      querying, using the CIC, a state information database for identifying a SIP call identifier (CID) associated with the CIC, wherein the state information database maintains associations between CICs and CIDs associated with related communications;

generating a first SIP signaling message that includes the first SIP identifier and the SIP CID, wherein the CIC identifies a BICC signaling session associated with the first BICC signaling message and wherein the SIP CID identifies a SIP session associated with the BICC signaling session;

routing the first SIP signaling message to a destination SIP node;

receiving a second SIP message associated with the first SIP message, wherein the second SIP message includes a second SIP identifier;

determining a second call party identifier associated with the second SIP identifier;

generating a second BICC signaling message that includes the second call party identifier; and routing the second BICC signaling message towards a BICC node.

12. The method of claim 11 wherein obtaining, from an ENUM database, a first SIP identifier associated with the first call party identifier includes sending a query message that includes call party information to the ENUM database and receiving an answer message that includes the first SIP identifier.

13. The method of claim 11 wherein the first call party identifier is an E.164 formatted telephone number, a mobile subscriber integrated services digital network number (MSISDN), or an international mobile subscriber identity (IMSI).

14. The method of claim 11 wherein the first SIP identifier is a uniform resource identifier (URI), an Internet protocol (IP) address, a domain name system (DNS) address, or an email address.

15. The method of claim 11 wherein the signaling router includes an interworking unit (IWU) for BICC-SIP interworking.

16. The method of claim 11 wherein the ENUM database is external to the signaling router.

17. The method of claim 11 wherein the ENUM database is internal to the signaling router.

18. The method of claim 11 wherein determining the second call party identifier associated with the second SIP identifier includes querying maintained state information.

19. The method of claim 11 wherein the second SIP identifier is associated with the same subscriber or device as the first SIP identifier and wherein the second call party identifier is the same as the first call party identifier.

20. The method of claim 11 wherein the second SIP identifier is the same as the first SIP identifier and wherein the second call party identifier is the same as the first call party identifier.

21. A non-transitory computer readable medium having stored thereon executable instructions that when executed by a processor of a computer control the computer to perform steps comprising:

at a signaling router:

receiving a first bearer independent call control (BICC) signaling message that includes a first call party identifier and a call instance code (CIC);

obtaining, from an ENUM database, a first SIP identifier associated with the first call party identifier;

querying, using the CIC, a state information database for identifying a SIP call identifier (CID) associated with the CIC, wherein the state information database maintains associations between CICs and CIDs associated with related communications;

generating a first SIP signaling message that includes the first SIP identifier and the SIP CID, wherein the CIC identifies a BICC signaling session associated with the first BICC signaling message and wherein the SIP CID identifies a SIP session associated with the BICC signaling session;

routing the first SIP signaling message to a destination SIP node;

receiving a second SIP message associated with the first SIP message, wherein the second SIP message includes a second SIP identifier;

determining a second call party identifier associated with the second SIP identifier;

generating a second BICC signaling message that includes the second call party identifier; and routing the second BICC signaling message towards a BICC node.

* * * * *